United States Patent
McDonald et al.

(10) Patent No.: US 7,376,139 B1
(45) Date of Patent: May 20, 2008

(54) INTER-SWITCH VOICEMAIL ANALYSIS TOOL

(75) Inventors: Randy Michael McDonald, Roswell, GA (US); Mort P. Burnett, Lawrenceville, GA (US); Odie Herman Garrison, Alpharetta, GA (US); Terry Randall Droke, Woodstock, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 1237 days.

(21) Appl. No.: 10/244,418

(22) Filed: Sep. 17, 2002

(51) Int. Cl.
    *H04L 12/28* (2006.01)
    *H04L 11/00* (2006.01)
    *H04M 7/00* (2006.01)
(52) U.S. Cl. .................. 370/410; 370/384; 379/221.1
(58) Field of Classification Search .................. None
    See application file for complete search history.

(56) References Cited

U.S. PATENT DOCUMENTS 6,775,651 B1 * 8/2004 Lewis et al. ............... 704/235

| | | | |
|---|---|---|---|
| 2001/0024497 A1 * | 9/2001 | Campbell et al. | 379/265.09 |
| 2004/0001579 A1 * | 1/2004 | Feinberg et al. | 379/156 |
| 2004/0240651 A1 * | 12/2004 | Adams et al. | 379/142.08 |
| 2006/0046698 A1 * | 3/2006 | O'Brien | 455/413 |

* cited by examiner

Primary Examiner—Fan Tsang
Assistant Examiner—Joseph T Phan
(74) Attorney, Agent, or Firm—Thomas, Kayden, Horstemeyer & Risley, LLP (57) ABSTRACT

A method for analyzing ISVM signaling messages that includes copying, to a message file, messages being transmitted through a signaling link, extracting ISVM messages from the message file that meet at least one trouble criterion, storing the extracted messages in an error report file, and generating an error report from the error report file. The error report lists the extracted messages. Examples of the trouble criterion include messages referencing a designated directory number, messages reporting an error, messages having a signaling point code and a destination point code that are equal, query messages having no matching responses, and unit data service messages.

3 Claims, 8 Drawing Sheets

PLEASE ANSWER YES (Y) OR NO (N) TO THESE QUESTIONS.

402 — DO YOU WANT TO EXTRACT THE QUERY AND RESPONSE MESSAGES FOR A SPECIFIC TELEPHONE NUMBER?
Y OR N: Y

404 — DO YOU WANT A DETAILED LIST OF RETURNED ERRORS?
Y OR N: Y

406 — DO YOU WANT A LIST OF MESSAGES WITH THE SAME SPC AND DPC?
Y OR N: Y

408 — DO YOU WANT A LIST OF QUERY MESSAGES NOT MATCHING A RESPONSE?
Y OR N: Y

410 — DO YOU WANT A LIST OF UDTS MESSAGES?
Y OR N: Y

412 — WHERE DO YOU WANT THE OUTPUT TO GO?
FILE (F) OR SCREEN (S) OR QUIT NOW (Q): F

UDTS MESSAGES: 502

| OPC | DPC | cdSSN | cgSSN | cdTT | cgGTTdigits |
|---|---|---|---|---|---|
| 252-10-0 | 252-13-76 | 249 | 0 | 7 | 4049368688 |
| DIAGNOSTIC: NO TRANSLATION FOR THIS SPECIFIC ADDRESS ||||||
| 252-10-0 | 252-13-76 | 249 | 0 | 7 | 6782271552 |
| DIAGNOSTIC: NO TRANSLATION FOR THIS SPECIFIC ADDRESS ||||||
| 252-10-0 | 252-13-76 | 249 | 0 | 7 | 7708689391 |
| DIAGNOSTIC: NO TRANSLATION FOR THIS SPECIFIC ADDRESS ||||||
| 252-10-0 | 252-13-76 | 249 | 0 | 7 | 6782272961 |
| DIAGNOSTIC: NO TRANSLATION FOR THIS SPECIFIC ADDRESS ||||||

QUERY MESSAGES WITH SAME SPC AND DPC: 504

| SPC | OPC | DPC | SSN | SSN | cdTT | DIGITS |
|---|---|---|---|---|---|---|
| 252-47-20 | 252-46-176 | 252-47-20 | 249 | 249 | 0 | 3054772977 |
| 252-47-20 | 252-46-176 | 252-47-20 | 249 | 249 | 0 | 3054999360 |

ISVM RESPONSE MESSAGES WITH RETURNED ERRORS: 506

| OPC | DPC | cd_digits | RETURNED ERROR |
|---|---|---|---|
| 252-47-43 | 252-47-20 | 3052219020 | MISSING CUSTOMER RECORD |
| 252-47-43 | 252-47-20 | 3052228216 | UNASSIGNED DN |
| 252-47-1 | 252-47-20 | 3052476619 | UNASSIGNED DN |
| . | . | . | . |
| . | . | . | . |
| . | . | . | . |
| 252-47-22 | 252-47-20 | 3057563556 | TASK REFUSED |
| 252-47-13 | 252-47-20 | 3058254881 | UNASSIGNED DN |
| 252-47-59 | 252-47-20 | 3058849327 | MISSING CUSTOMER RECORD |
| 252-47-20 | 252-47-45 | 3059949091 | UNASSIGNED DN |

QUERY MESSAGES WITH NO MATCHING RESPONSE MESSAGE: 508

| SPC | OPC | DPC | TRAN ID | cld SSN | clg SSN | cld TT | cld or dest digits |
|---|---|---|---|---|---|---|---|
| 252-47-20 | 252-47-20 | 252-47-150 | e3e00 | 0 | 249 | 7 | 7864736260 |
| MESSAGE TIME STAMP 10:07:26.197 ||||||||
| 252-47-20 | 252-47-20 | 252-47-150 | f3e00 | 0 | 249 | 7 | 7862182186 |
| MESSAGE TIME STAMP 11:35:25.500 ||||||||
| 252-47-20 | 252-47-20 | 252-47-150 | g3e00 | 0 | 249 | 7 | 3053352548 |
| MESSAGE TIME STAMP 12:56:36.962 ||||||||

FIG. 5    500

SUMMARY FOR DATA FILE:

| QUERY MESSAGE IGNORED | QUERY MESSAGE CHECKED | RESPONSE MESSAGE TOTAL | QUERY /RESPONSE MATCHES |
|---|---|---|---|
| 3 | 535 | 299 | 299 |

| UDT MESSAGES | UDTS MESSAGES | SCCP MESSAGES | NON-SCCP MESSAGES | TOTAL MESSAGES |
|---|---|---|---|---|
| 837 | 0 | 837 | 0 | 837 |

COUNT OF RESPONSES WITH RETURNED ERRORS: 59
COUNT OF QUERY NOT MATCHING A RESPONSE: 236

QUERY MESSAGES WITH APPARENT ERRORS IN DECODED DATA: 0
RESPONSE MESSAGES WITH APPARENT ERRORS IN DECODED DATA: 0
UNDETERMINED ERRORS IN MESSAGE: 0
COUNT OF MESSAGE LENGTH TOO LONG: 0

OPC OR DPC DOES NOT AGREE WITH LINKSET, COUNT IS: 0
COUNT OF QUERY MESSAGES WITH SAME SPC AND DPC: 2
COUNT OF RESPONSE NOT MATCHING A QUERY: 0
COUNT OF LATE RESPONSES: 0

COUNT OF UDT MESSAGES IGNORED (SSN OTHER THAN 249): 0
COUNT OF UNIDIRECTIONAL MESSAGES IGNORED: 0
COUNT OF CONVERSATION MESSAGES IGNORED: 0
COUNT OF NON UDT/UDTS MESSAGES: 0

COUNT OF RE-USED TRANSACTION IDs: 181

INTER-SWITCH VOICEMAIL ANALYSIS TOOL

BACKGROUND

1. Field of the Invention

The present invention relates generally to voicemail provided over the public switched telephone network, and more particularly, to a system and method for analyzing signaling messages for inter-switch voicemail trouble conditions.

2. Background of the Invention

Inter-switch voicemail (ISVM) enables multiple central offices to communicate with multiple voicemail platforms through a single end office. In requiring only the single end office, inter-switch voicemail makes highly efficient use of network resources, especially in comparison to the early generation voicemail systems that dedicated end offices to supporting only one voicemail platform. Unfortunately, along with providing the increased capacity, inter-switch voicemail introduces significant complexities to the call flow and message waiting indicator signaling. These complexities can make troubleshooting inter-switch voicemail systems extremely challenging.

Figure 1:
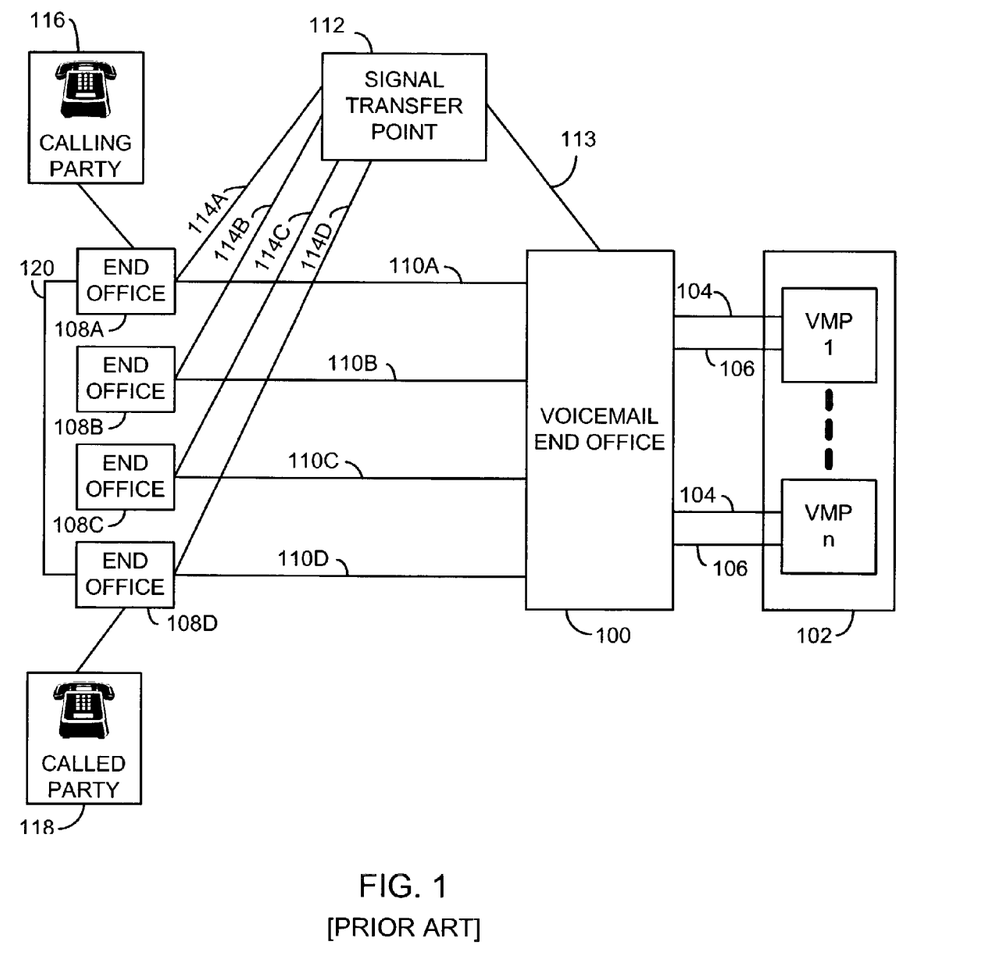
FIG. 1 is a schematic diagram illustrating a conventional inter-switch voicemail architecture.

FIG. 1 illustrates a simple example of a conventional inter-switch voicemail architecture. As shown, the architecture includes a voicemail end office 100 in communication with multiple voicemail platforms (VMPs) 102 through multi-line hunt groups 104 and Simplified Message Desk Interface (SMDI) links 106. Voicemail end office 100 is also in communication with end offices 108A-D through trunk groups 110A-D and with signal transfer point (STP) 112 through a Signaling System 7 (SS7) link 113. Signal transfer point 112 is also in communication with end offices 108A-D through SS7 links 114A-D.

Although FIG. 1 shows only one signal transfer point 112, one of ordinary skill in the art would appreciate that multiple signal transfer points could be used to provide a desired redundancy.

To illustrate a typical call flow, FIG. 1 shows a calling party 116 calling a called party 118. End office 108A serves calling party 116, while end office 108D serves called party 118. Assuming that a trunk line 120 connects end office 108A to end office 108D, the call would set up according to normal SS7 processing, including an initial address message, an answer message, a release, a release complete, and then voice path assurance.

With the call set-up complete, if called party 118 does not answer or is already on the line, then the end office 108D that serves called party 118 redirects the call through trunk line 110D and end office 100 to the appropriate voicemail platform 102. If called party 118 does not answer, this call redirect is generally referred to as "call-forwarding don't answer." If called party 118 is already on the line, this call redirect is generally referred to as "call-forwarding busy line."

After voicemail platform 102 plays a greeting and records a message from calling party 116, voicemail platform 102 must activate a message waiting indicator (MWI) on the telephone of called party 118, to notify called party 118 that she has a saved message. Thus, voicemail platform 102 sends a message to voicemail end office 100 through SMDI link 106. Voicemail platform 102 transmits the message using Inter-switch Simplified Message Desk Interface (ISMDI), which is a signaling interface used by voicemail platforms to support incoming call and message waiting integration between all supported switches in a Local Access and Transport Area (LATA). Simplified Message Desk Interface (SMDI) defines signaling between a messaging system and a central office switch, which defines the original intended destination of a forwarded call. The ISMDI MWI message sent by voicemail platform 102 references the telephone number of called party 118.

After receiving the ISMDI MWI message, voicemail end office 100 determines if it "owns" (i.e., is associated with) the NPA/NXX (NPA—Numbering Plan Area/NXX—a specific central office) corresponding to the telephone number of called party 118. Assuming that voicemail end office 100 does not own the telephone number, voicemail end office 100 forwards an MWI message through SS7 link 113 and to signal transfer point 112 using a non-call-associated Signaling System 7 (SS7) signaling protocol, such as Transaction Capability Application Part (TCAP).

Signal transfer point 112 contains a database that cross-references NPA/NXXs with the network point codes of end offices. Thus, based on the telephone number referenced in the MWI message, signal transfer point 112 determines to which end office 108A-D the MWI message should be forwarded. With this routing information, signal transfer point 112 transmits a TCAP message to the end office corresponding to the telephone number of called party 118, which in this case is end office 108D connected through SS7 link 114D. End office 108D then activates the message waiting indicator on the telephone of called party 118.

After called party 118 retrieves the message, voicemail platform 102 sends another MWI message through signal transfer point 112 to clear the message waiting indicator at the telephone of called party 118.

As evident from FIG. 1, the multiple links and end offices of the typical ISVM architecture can make it difficult to troubleshoot signaling problems. Examples of common signaling problems include tasks refused, unassigned numbers, incorrect or missing routing, and missing customer records.

As an example of a task refused error, signal transfer point 112 may deliver an MWI message to end office 108D, which then refuses to pass the message to the telephone of called party 118. A common reason for refusing the task is that end office 108D is in the process of performing a back-up. Another possible reason is a translation error in the switch, which is referred to as a "split" when the switch is a Lucent 5ESS™ switch. A translation error could be caused by, for example, a corrupt database in the switch that does not properly relate the call features of a customer to the customer's telephone number.

Unassigned numbers are not assigned in the switch, and are, for example, ported out erroneously to another switch, such as a competitive carrier switch. In this case, when end offices 108A-D receive an MWI message for an unassigned number, the switches simply ignores the MWI message.

Misrouted MWI messages can occur, for example, when one or more signal transfer points of several redundant signal transfer points contain faulty routing translations. In this situation, the signal transfer points that contain correct routing translations route MWI messages to the appropriate end offices, while the signal transfer points that contain faulty translations route the MWI message to incorrect end offices. These incorrect end offices simply ignore the MWI messages, leaving no record by which to troubleshoot the problem.

A no routing error is another common problem. In this case, a mismatch exists between the NPA/NXX records of the voicemail platform and the NPA/NXX records of the signal transfer point or end office. For example, when a new NPA/NXX is opened in the voicemail platform, there may be a lag before the corresponding routing is opened in the signal transfer point and/or end office.

As another common problem, sometimes the voicemail platform may be missing customer records. In this case, the voicemail platform fails to recognize the called party's telephone number and does not send the MWI message at all.

Because of the many possible errors, identifying the source of a voicemail problem can be particularly frustrating. In addition, the idiosyncrasies of the hardware can compound the problem by remaining silent when errors occur. Indeed, it is common for switches, signal transfer points, and voicemail platforms to simply ignore errors, remain silent, and fail to report or record any problem.

To gain a better understanding of error conditions, telephone service providers focus on the signaling portion of the public switched telephone network, and analyze portions of the SS7 protocol that carry ISVM information. This ISVM information is extremely valuable in resolving trouble reported by end-user telephone subscribers who are having voicemail problems.

The analysis of the SS7 protocol is usually left to troubleshooting experts, who sift through call records and spot error patterns that provide clues as to the sources of the problems. Unfortunately, this process is exceedingly time-consuming. The expert must analyze large volumes of call records to identify the intermittent problems among the majority of normal call flows.

Thus, there remains a need for a tool that assists in the detection, diagnosis, and resolution of inter-switch voicemail trouble.

SUMMARY OF THE INVENTION

The present invention provides a system and method for analyzing signaling messages and isolating messages relating to inter-switch voicemail (ISVM) problems. In a representative embodiment, the present invention captures SS7 protocol messages associated with specific ISVM trouble conditions. The present invention provides focused and detailed error reports that assist telephone service providers in resolving complex ISVM problems, by allowing operators to quickly and easily segment or sectionalize trouble conditions.

An embodiment of the present invention provides a method for analyzing ISVM signaling messages that includes copying, to a message file, messages being transmitted through a signaling link, extracting ISVM messages from the message file that meet the at least one trouble criterion, storing the extracted messages in an error report file, and generating an error report from the error report file. The error report lists the extracted messages, providing a telephone service provider with a valuable troubleshooting tool.

Examples of the trouble criterion include messages referencing a designated directory number (DN), messages reporting an error (e.g., "returned errors"), messages having a signaling point code and a destination point code that are equal, query messages having no matching responses, and unit data service messages. A user can specify one or more of these criteria to control the types of errors included on the error report.

Thus, the present invention allows a telephone service provider to extract SS7 TCAP query and response messages from the SS7 protocol. In addition, the telephone service provider can limit the extraction of messages to an individual subscriber telephone number if, for example, the user has received a complaint from a specific subscriber or group of subscribers. The present invention also provides telephone service providers with a detailed error report with which telephone service providers can review returned errors and check for valid point codes and matching query/response messages.

DETAILED DESCRIPTION OF THE INVENTION

Figure 2:
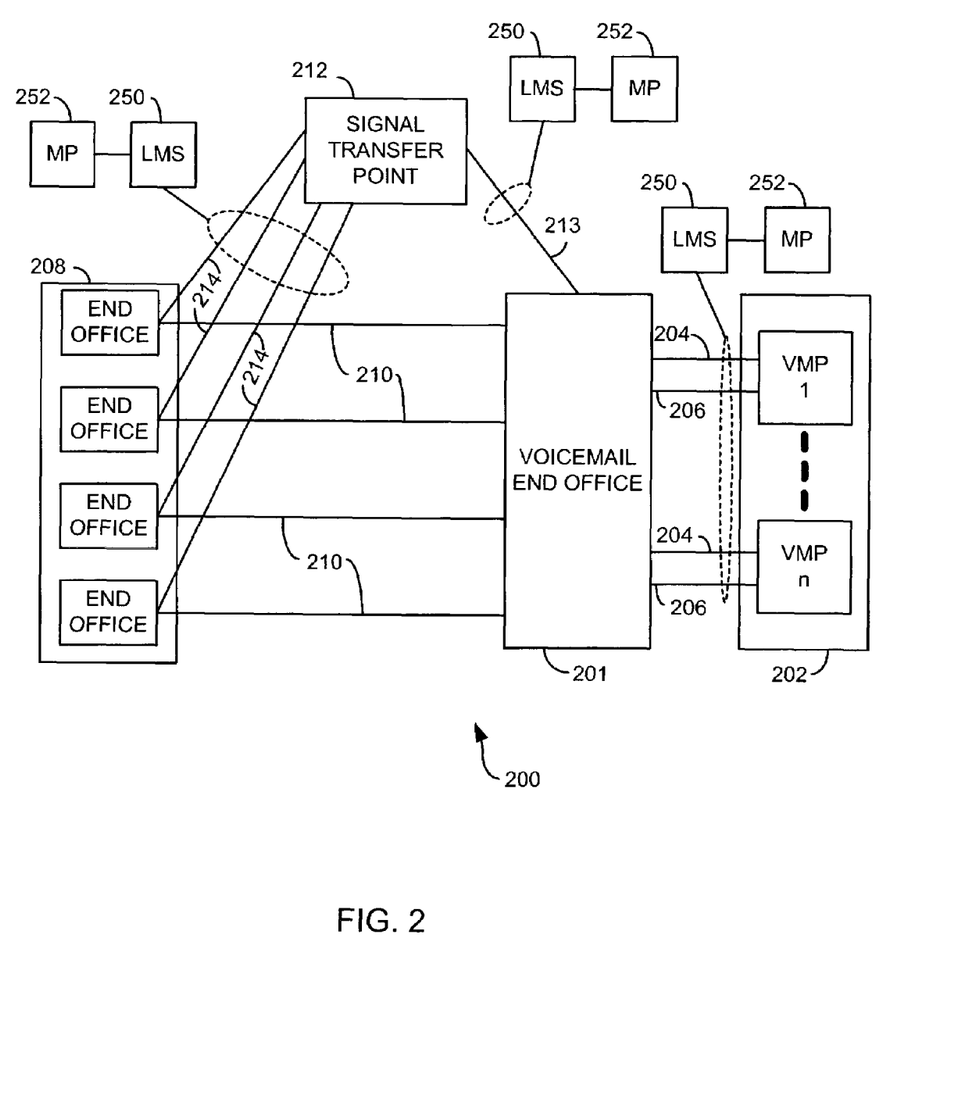
FIG. 2 is a schematic diagram of a system for analyzing ISVM signaling messages for trouble conditions, according to an embodiment of the present invention.

FIG. 2 illustrates a system 200 for analyzing ISVM signaling messages for trouble conditions, according to an embodiment of the present invention. As shown, system 200 includes a voicemail end office 201, voicemail platforms 202, end offices 208, signal transfer point 212, one or more link monitoring systems 250, and one or more message processors 252.

Voicemail end office 201 is in communication with voicemail platforms 202 through multi-line hunt groups 204 and SMDI links 206. Voicemail end office 201 is also in communication with end offices 208 through trunk groups 210 and with signal transfer point 212 through an SS7 link 213. Signal transfer point 212 is also in communication with end offices 208 through SS7 links 214.

One or more link monitoring systems 250 are in communication with one or more of links 206, 213, and 214. Link monitoring systems 250 capture the data (e.g., TCAP messages) passing through links 206, 213, and 214. Link monitoring systems 250 are non-invasive and do not affect the transmission of the data. An example of a suitable link monitoring system is the acceSS7™ system manufactured by Agilent Technologies of Palo Alto, Calif.

Although FIG. 2 shows three link monitoring systems 250, as one of ordinary skill in the art would appreciate, the number and location of link monitoring systems 250 would depend on the particular ISVM architecture in which they are implemented, and on the particular messages and/or portions of the system a user desires to monitor. In addition, instead of multiple link monitoring systems 250, a single link monitoring system could be in communication with multiple links.

The one or more message processors 252 are in communication with the one or more link monitoring systems 250. Message processors 252 analyze the data captured by link monitoring systems 250. The particular methods by which message processors 252 perform this analysis are presented in the flowcharts below. Although FIG. 2 shows three separate message processors 252, one of ordinary skill in the art would appreciate that a single message processor could be in communication with the one or more link monitoring systems 250. In addition, although the link monitoring systems 250 and message processors 252 are shown as separate components, they could be combined into a single component.

Figure 3A:
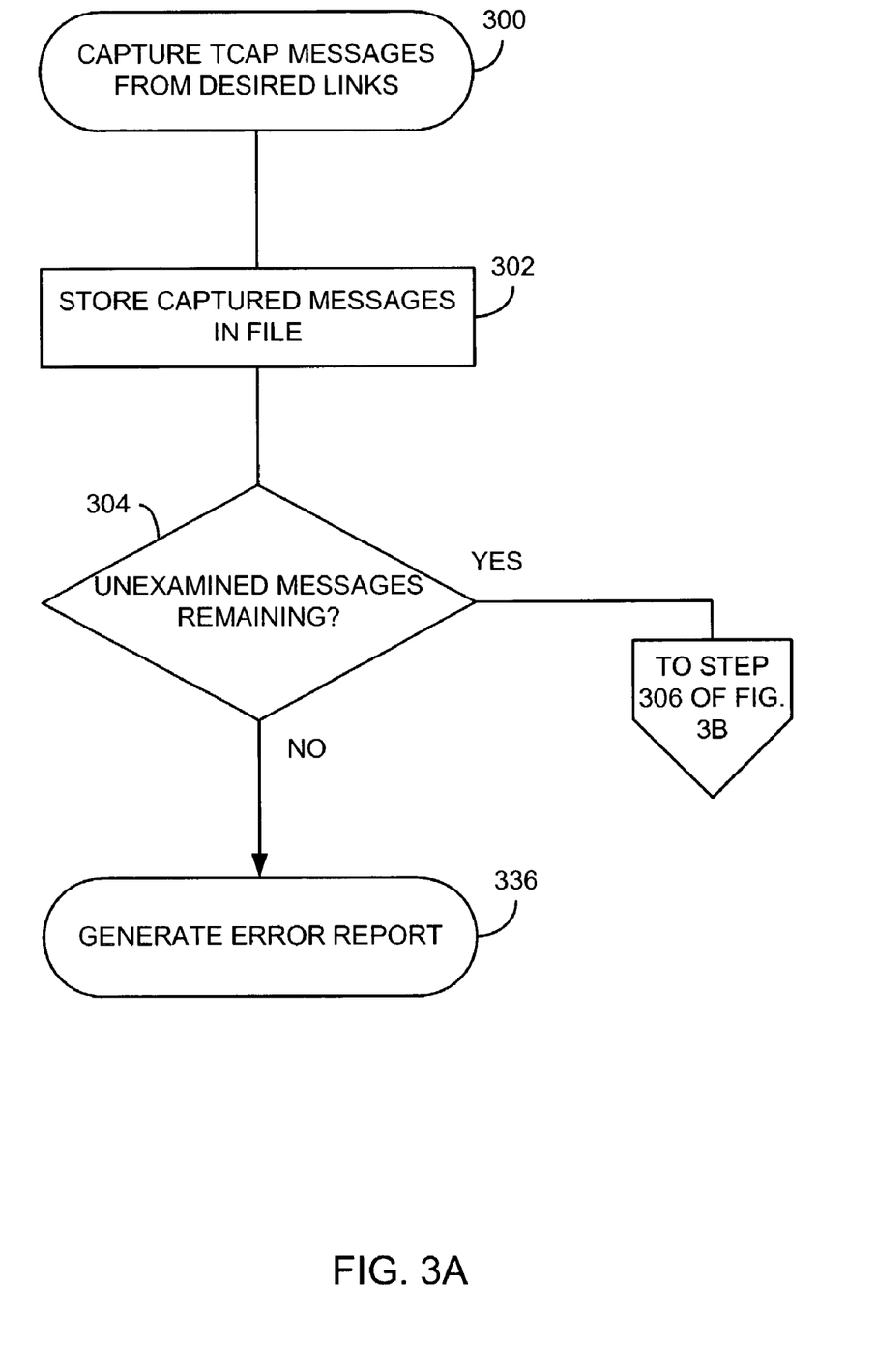
FIGS. 3A-3C are flowcharts illustrating a method for analyzing signaling messages for inter-switch voicemail trouble conditions, according to an embodiment of the present invention.
Figure 3B:
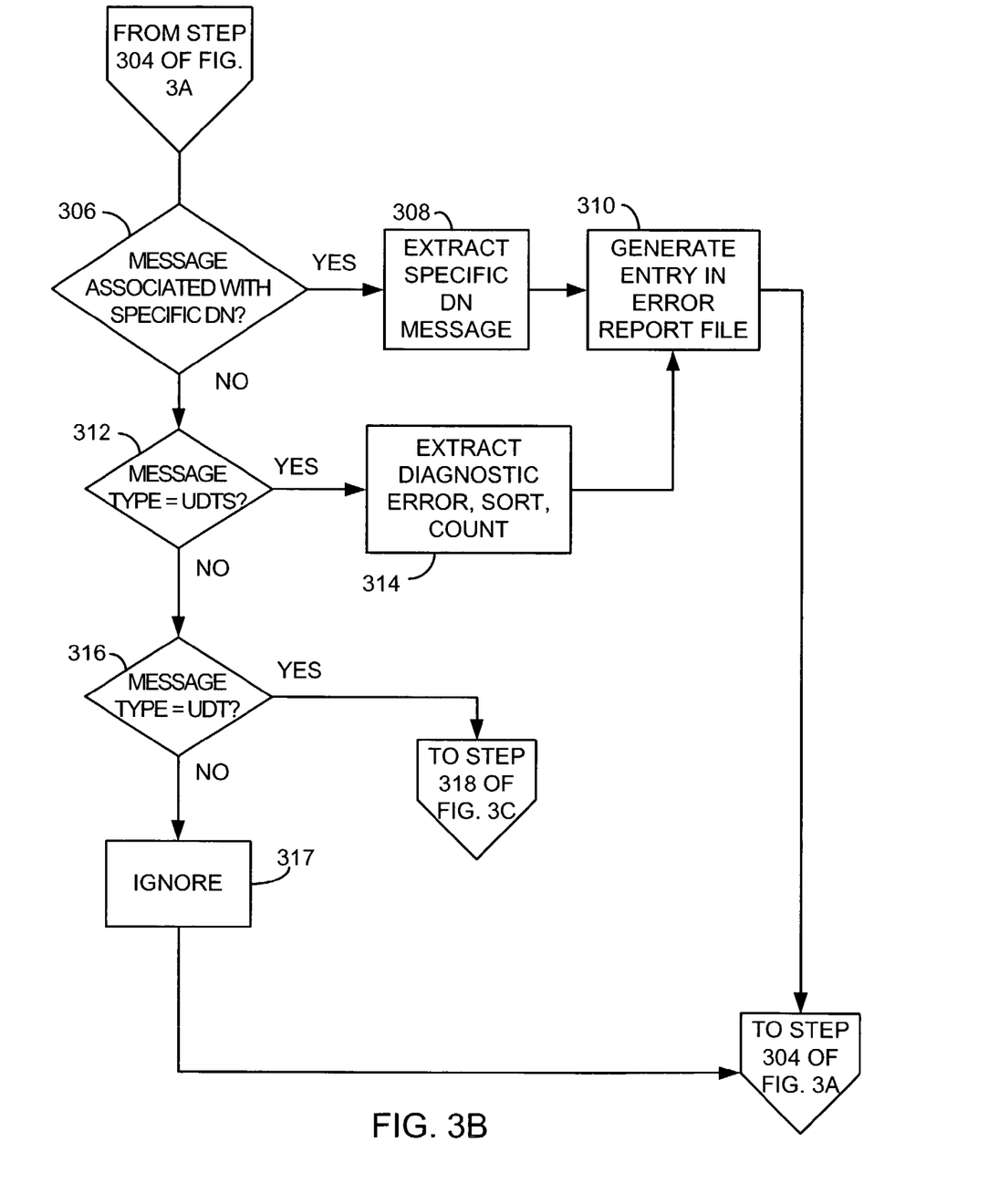

With continuing reference to the exemplary architecture of FIG. 2, FIGS. 3A-3B illustrate a method for analyzing signaling messages for inter-switch voicemail trouble conditions, according to an embodiment of the present invention. As shown, the method begins in step 300 with the capture of TCAP messages from one or more links that the user wishes to troubleshoot. In the exemplary system 200 of FIG. 2, link monitoring systems 250 capture messages from at least one of links 206, 213, and 214. After capturing messages from the desired link(s), in step 302, the captured messages are stored in a file.

In step 304, the method continues by determining whether all of the individual messages stored in step 302 have been examined. In this example, message processors 252 make this determination.

Assuming that at least one message is unexamined (i.e., "yes" to step 304), the method continues by extracting query/response messages meeting specific criteria. The specific criteria are, for example: 1) messages referencing a specific directory number (e.g., a particular NPA/NXX); 2) messages reporting an error; 3) messages having a signaling point code (SPC) and a destination point code (DPC) that are equal; 4) query messages having no matching responses; and/or 5) unit data service (UDTS) messages.

To search for messages satisfying these exemplary criteria, the method continues in step 306 of FIG. 3B by determining whether the next unexamined message in the file created in step 302 is associated with a specific directory number. The user designates this directory number, which typically would be a directory number for which the user has received trouble reports (e.g., the telephone numbers of subscribers complaining about voicemail problems). If the unexamined message is associated with the specific directory number (i.e., "yes" in step 306), then the method continues in step 308 by extracting the specific directory number message. Then, in step 310, the specific directory number message is recorded in an entry of an error report file. With this message processed, the method returns to step 304 of FIG. 3A to continue examining any unexamined messages.

In returning to step 304, the method examines the next unexamined query/response message in the file of step 302. Assuming that this next message does not reference the specific directory number designated by the user, then the decision in step 306 is "no" and the method continues to step 312. In step 312, the method determines whether the message is a UDTS-type message. If the message is a UDTS message (i.e., "yes" in step 312), then, in step 314, the diagnostic error of the UDTS message is extracted, sorted, and counted. The diagnostic error is recorded in an entry of the error report file of step 310. Then, with the UDTS message disposed, the method returns to step 304 to process the next unexamined message.

Assuming that the next message does not reference the designated directory number ("no" to step 306) and is not a UDTS message ("no" to step 312), then the method determines whether the message is a unit data (UDT) message in step 316. If the message is not a UDT message, then the message is ignored in step 317 and the method returns to step 304 to process the next unexamined message. In reaching step 317, it is determined that the message is not helpful for troubleshooting the inter-switch voicemail problems embodied in steps 306, 312, and 316. For example, the message could be an integrated services digital network user part (ISUP) message, which determines the procedures for setting-up, coordinating, and taking down trunk calls on the SS7 network, and which is unrelated to inter-switch voicemail problems. One of ordinary skill in the art would appreciate, however, that other types of messages not embodied in steps 306, 312, and 316 might be useful for analyzing ISVM problems. Thus, the present invention should not be construed as limited to the particular message types retrieved and isolated in the flowcharts of FIGS. 3A-3C.

Figure 3C:
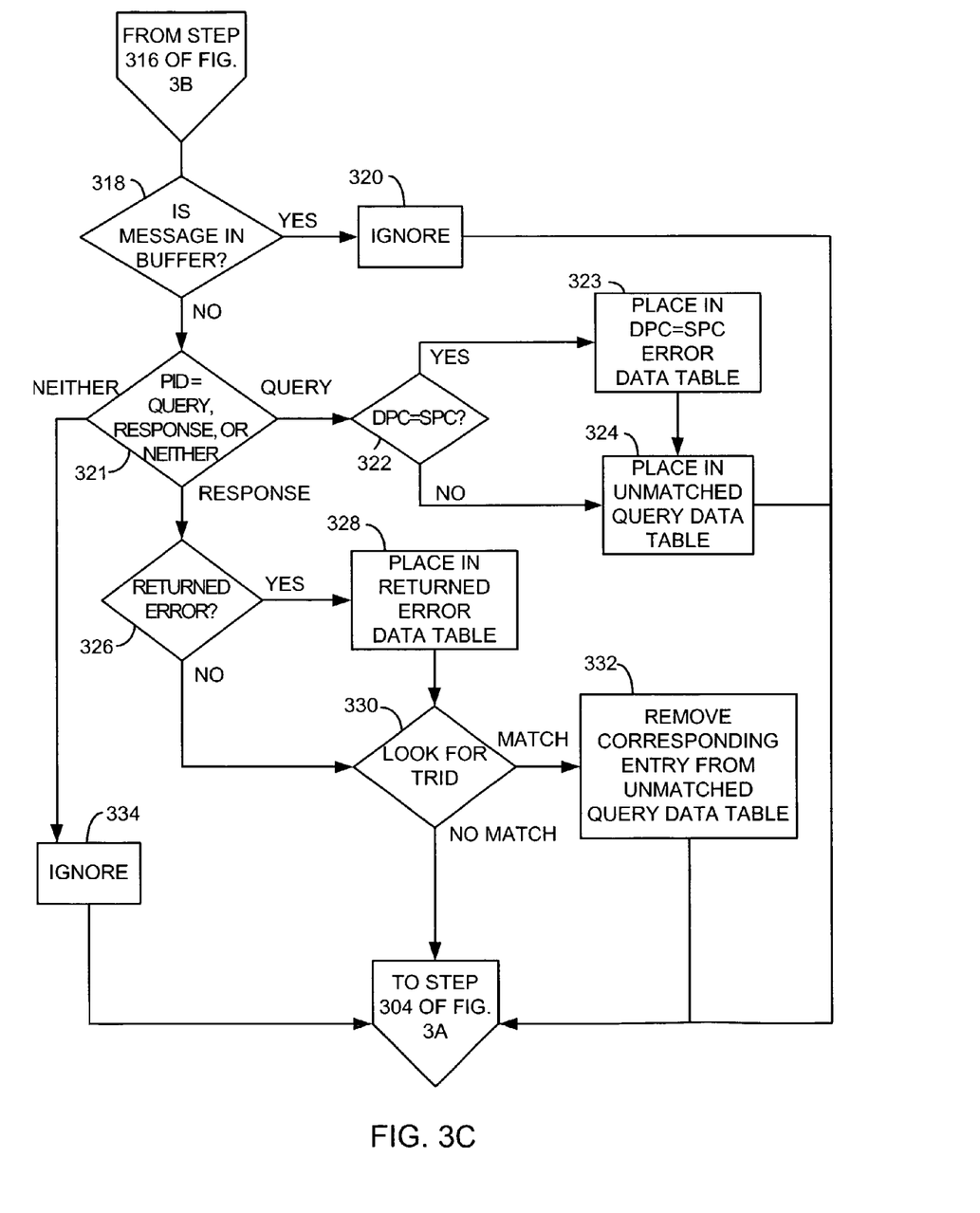

If, in step 316, the message is a UDT message, then the method proceeds to step 318 of FIG. 3C, which determines whether the UDT message appears near the beginning or end of the data sample captured in step 300 and stored in step 302. The user provides the parameters that define what is "near" the beginning or end of the data sample. Preferably, however, "near" the beginning or end of the data sample is measured as a length of time slightly longer than the maximum lag time between a query message and a response message as defined by the messaging protocol. For example, if an SS7 protocol dictates a response within three seconds of its corresponding query, then the user could define "near" the beginning or end as within four seconds.

The goal of the buffer defined by step 318 is to exclude UDT query/response messages whose corresponding query/response messages were not captured within the data sample of steps 300 and 302. For example, if a response message appears within the first three seconds of the data sample, then the query message corresponding to that response message was sent before the period of the data sample. Likewise, if a query message appears within the last three seconds of the data sample, then the response message to that query message was sent after the collection of the data sample was over. Thus, in step 318, if the UDT message appears near the beginning or end of the data sample within the specified buffer (i.e., "yes" in step 318), then that UDT message is ignored in step 320. The method then returns to step 304 to process the next unexamined message.

If the UDT message does not appear within the specified beginning and ending buffer (i.e., "no" in step 318), then the method continues in step 321 by determining whether the package type identifier (PID) of the UDT message is a query message, a response message, or neither.

If the UDT message is a query (i.e., "query" in step 321), then, in step 322, the method determines if the UDT query message has a signaling point code and a destination point code that are equal. If the signaling point code and the destination point code are equal, then, in step 323, a copy of the UDT query message is placed in a "DPC=SPC" error data table, which is part of the error report file described in step 310. Then, in step 324, the UDT query message is recorded in an unmatched query data table, which is also a part of the error report file described in step 310, but is separate from the "DPC=SPC" error data table. The method then returns to step 304 to process the next unexamined message.

If, in step 322, the signaling point code and destination point code of the UDT query message are determined to be different, then the method proceeds directly to step 324 to record the UDT message in the unmatched query data table, without storing the message in the "DPC=SPC" error data table of step 323.

If the UDT message is a response (i.e., "response" in step 321), then, in step 326, the UDT response message is examined to see if it contains a returned error. According to typical inter-switch voicemail signaling, UDT response messages provide returned errors intended to alert users to trouble. Examples of returned errors include task refused, missing customer records, and unassigned directory number. These returned errors are valuable in analyzing ISVM trouble conditions. Thus, if the UDT response message contains a returned error in step 326, then, in step 328, a copy of the UDT response message, along with its associated returned error, is placed in a returned error data table, which is part of the error report file described in step 310. This returned error data table is separate from the unmatched query data table of step 324.

The method continues in step 330 after either 1) finding no returned error in step 326, or 2) finding an error in step 326 and storing a copy of the UDT response message and its returned error in the separate returned error data table in step 328. In step 330, the transaction identifier (TRID) of the UDT response message is compared to the transaction identifiers of the query messages listed in the unmatched query data table of step 324. In normal operation, each query message is assigned a transaction identifier that is also associated with the response message that responds to the query message. Thus, if no trouble condition exists, then the transaction identifier of the response message matches a transaction identifier of a query message in the unmatched query data table. In this case, the matching query message is removed from the unmatched query data table in step 332. The method then returns to step 304 to process the next unexamined message.

Repeating steps 330 and 332 for a series of UDT messages filters out the normal entries in the unmatched query data table of step 324, leaving the unmatched query data table to include only the UDT query messages that have no matching response. By highlighting the trouble conditions in this unmatched query data table (which is part of the error report file of step 310), a user can more easily troubleshoot network errors.

Returning to step 330, if the transaction identifier of the response message does not match any transaction identifiers of the query messages listed in the unmatched query data table of step 324, then the response message is ignored and the method returns to step 304 to process the next unexamined message. Alternatively, instead of ignoring the response messages that have no corresponding query message, the response messages could be copied to another error data table of the error report file of step 310. In this manner, the method could detect additional routing problems, such as response messages sent to the wrong central office.

Returning to step 321, if the UDT message is neither a query message nor a response message, then the message is ignored in step 334. These ignored messages would typically not be relevant to troubleshooting inter-switch voicemail UDT messages. The method then returns to step 304 to process the next unexamined message.

As shown in FIGS. 3A-3C, the method repeats between step 304 and the steps of FIGS. 3B and 3C until all captured messages in the file of step 302 have been examined. As the steps repeat, the method collects messages associated with a designated directory number, UDTS messages, returned error messages, query messages having the same signaling point code and destination point code, and query messages having no matching response message. With all the messages examined and the errors collected and stored in the error report file of step 310, the method concludes in step 336 by generating an error report listing all of the collected error messages.

Figure 4:
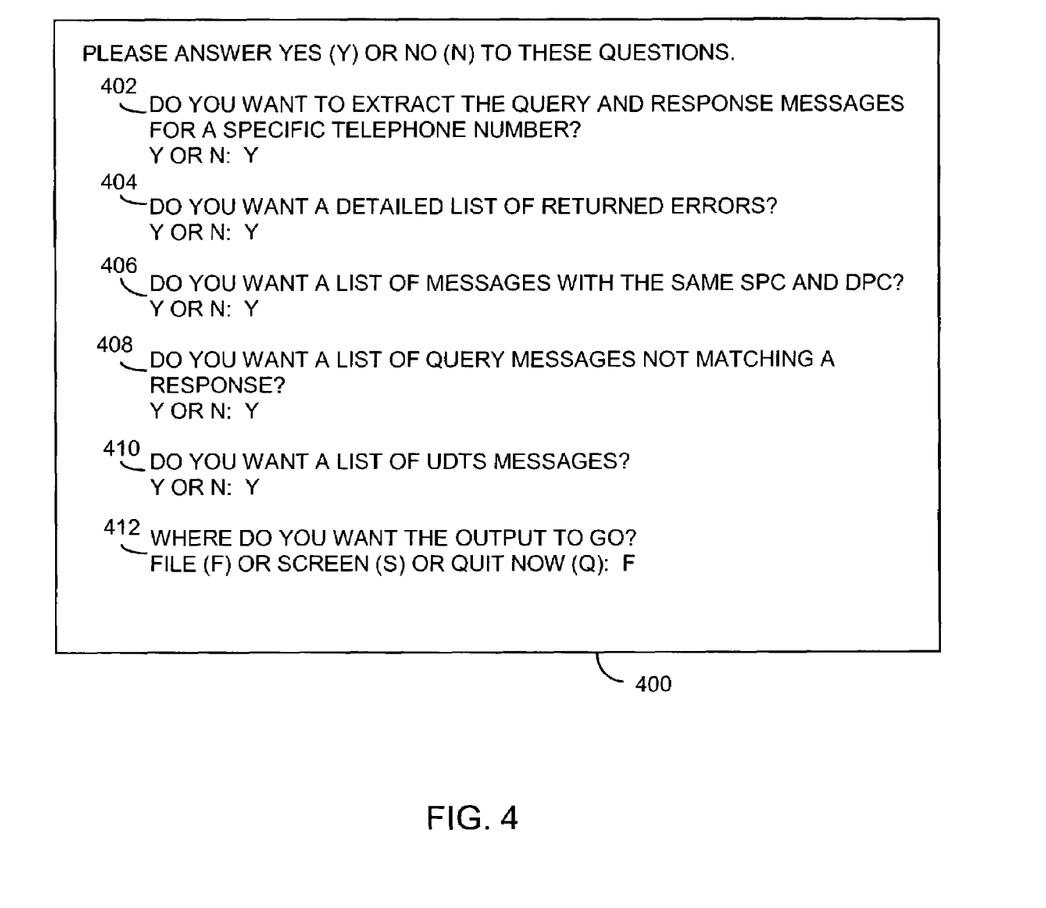
FIG. 4 is an illustration of an exemplary user interface through which a user prescribes the specific criteria for analyzing ISVM messages, according to an embodiment of the present invention.

FIG. 4 illustrates an exemplary user interface 400 through which a user prescribes the criteria that messages on the error report must meet, according to an embodiment of the present invention. By answering a series of questions, the user dictates which query/response messages will be extracted from the file of step 302 and placed on error report 336. In other words, the user dictates which of steps 304 to 334 will be executed. As shown in FIG. 4, the user can choose to extract query and response messages for a specific telephone number (question 402), can choose to extract a detailed list of returned errors (question 404), can choose to extract messages having the same SPC and DPC (question 406), can choose to extract query messages not having a matching response (question 408), and can choose to extract UDTS messages (question 410). The user can also designate how the messages that meet the criteria should be output (question 412).

As one of ordinary skill in the art would appreciate, the answer to each of these questions would determine which of the steps of FIGS. 3B and 3C are executed. For example, if a user chose not to extract the messages of a specific directory number, then the method would exclude steps 306 and 308, and would continue with the message analysis embodied in the remaining steps. In this situation, the extracted messages would not be limited to one directory number.

Figure 5:
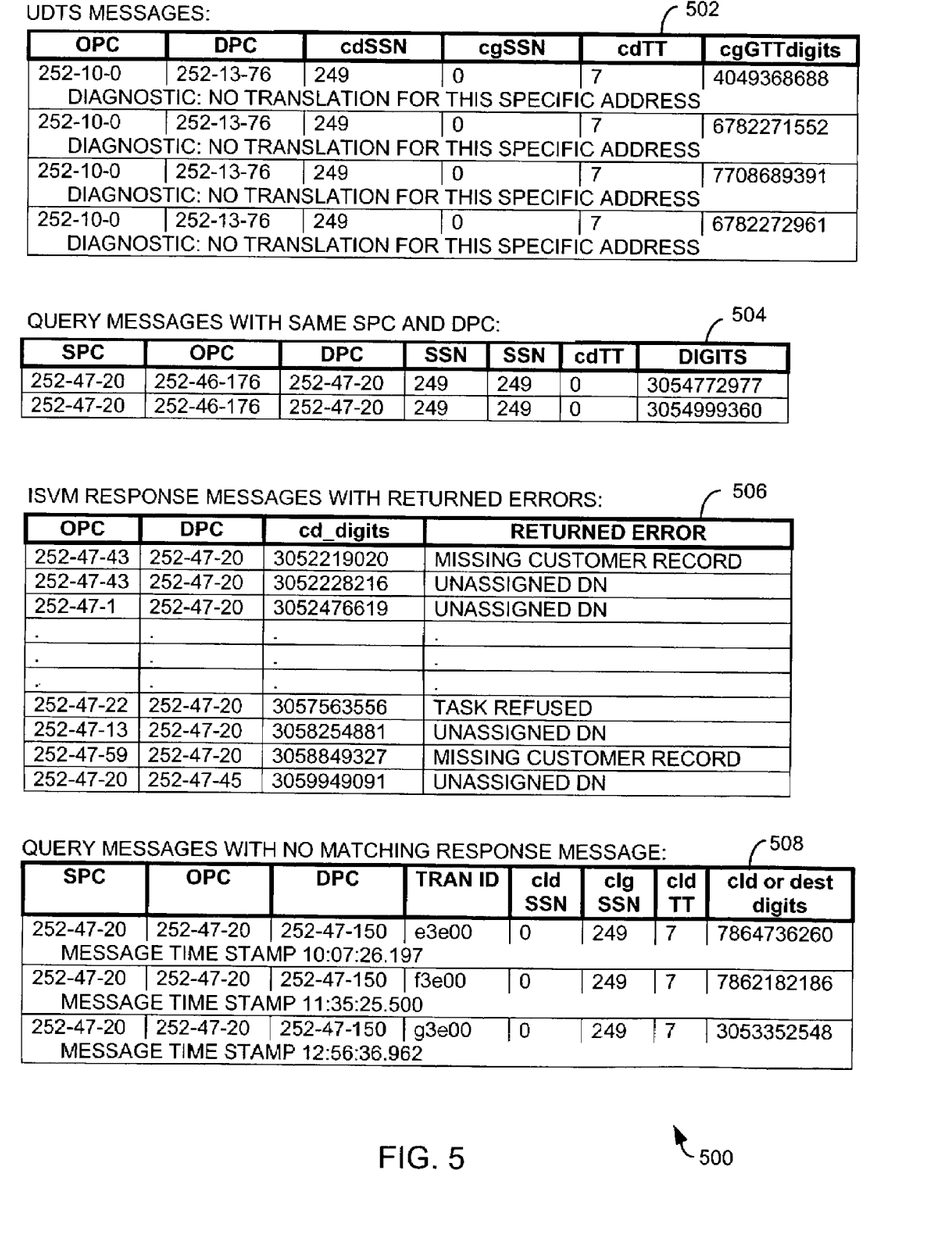
FIG. 5 is an illustration of an exemplary abbreviated error report, according to an embodiment of the present invention.

FIG. 5 illustrates an exemplary abbreviated error report 500 generated in step 336, according to an embodiment of the present invention. This particular report 500 includes a section 502 listing UDTS messages, a section 504 listing query messages with the same SPC and DPC, a section 506 listing ISVM response messages with returned errors, and a section 508 listing query messages with no matching response message. Although FIG. 5 illustrates only a portion of the data in each section, the actual report would likely contain long listings of error messages.

Report 500 therefore serves as an invaluable resource for the telephone service provider, allowing the telephone service provider to review the data for patterns, to analyze the trouble conditions, and to identify and resolve the sources of the problems. As an example, from section 504, a user would see that a message is bouncing back and forth, and that the message should not have been sent. This error could be due to, for example, an erroneous trigger set on the line. As another example, in section 506, a user could look for repeated returned errors of a particular type (e.g. task refused), which could indicate a database problem. Also in section 506, a user could look for repeat entries of a particular directory number, which could indicate an unassigned directory number.

One of ordinary skill in the art would understand the abbreviated headings shown in the exemplary report 500 of FIG. 5. For example, "OPC" stands for originating point code, "DPC" stands for destination point code, "SPC" stands for signaling point code, "cdSSN" and "cld SSN" stand for called subsystem number, "cgSSN" and "clg SSN" stand for calling subsystem number, "cgGTTdigits" stands for calling global title translations, "cd_digits" stands for called digits, "TRAN ID" stands for transaction identifier, "cdTT" and "cld TT" stand for called translation type, and "cld or dest digits" stand for called or destination digits.

Figure 6:
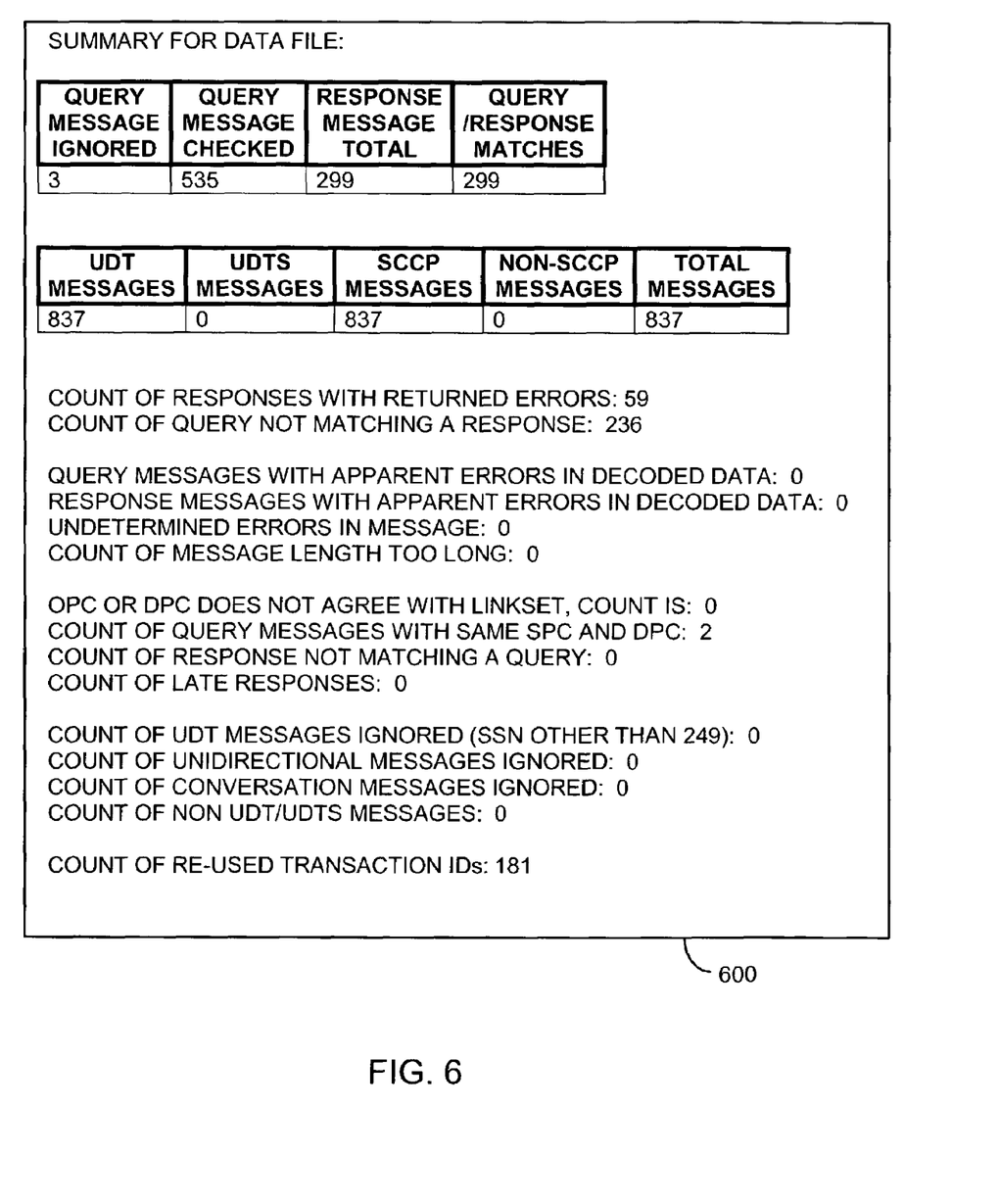
FIG. 6 is an illustration of an exemplary summary report that accompanies an error report, according to an embodiment of the present invention.

FIG. 6 illustrates an exemplary summary report 600 that accompanies an error report, such as error report 500 of FIG. 5, according to an embodiment of the present invention. This summary report 600 provides an overview of the data contained in an error report, including the totals of pertinent message counts. For example, summary report 600 lists five hundred thirty-five query messages checked, with only two hundred ninety-nine matching response messages found. These numbers would show a user that approximately 44% of the queries failed, thereby alerting the user to a significant problem, such as an incorrect routing program at a signal transfer point.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for analyzing inter-switch voicemail signaling messages comprising:

copying, to a message file, transaction capability application part (TCAP) messages being transmitted through a signaling system 7 link of a public switched telephone network, wherein the TCAP messages are copied for a period of time, wherein the inter-switch voicemail signaling messages conform to a signaling protocol, and wherein the signaling protocol defines a maximum query response time;

identifying TCAP messages that reference a designated directory number;

copying the TCAP messages that reference the designated directory number into an error report file;

identifying TCAP messages that are unit data service messages;

copying the unit data service TCAP messages into the error report file;

identifying TCAP messages that are unit data messages;

defining a beginning portion of the period and an ending portion of the period, wherein the beginning portion and the ending portion are at least as long as the maximum query response time, wherein unit data TCAP messages that were copied to the message file during one of the beginning portion and the ending portion are buffer unit data TCAP messages, and wherein unit data TCAP messages that were not copied to the message file during one of the beginning portion and the ending portion are non-buffer unit data TCAP messages;

determining which of the non-buffer unit data TCAP messages are query messages;

copying the non-buffer unit data TCAP query messages into a table;

determining which of the non-buffer unit data TCAP messages are response messages;

deleting, from the table, non-buffer unit data TCAP query messages that have transaction identifiers equal to a transaction identifier of the non-buffer unit data TCAP response messages, thereby leaving remaining non-buffer unit data TCAP query messages in the table;

copying the remaining non-buffer unit data TCAP query messages into the error report file; and generating an error report from the error report file.

2. The method of claim 1, further comprising copying non-buffer unit data TCAP response messages that have returned errors into the error report file.

3. The method of claim 1, further comprising copying non-buffer unit data TCAP query messages that have a signaling point code and a destination point code that are equal into the error report file.

* * * * *